United States Patent
Robinson

[15] 3,635,572
[45] Jan. 18, 1972

[54] BORING BAR ADJUSTMENT
[72] Inventor: James J. Robinson, Southfield, Mich.
[73] Assignee: The Valeron Corporation
[22] Filed: May 18, 1970
[21] Appl. No.: 38,392

[52] U.S. Cl............................................408/181, 408/185
[51] Int. Cl......................................................B23b 29/034
[58] Field of Search..................408/146, 147, 153, 181, 185

[56] References Cited

UNITED STATES PATENTS 2,661,218  12/1953  Snow et al. ...........................408/181
3,433,104  3/1969  Milewski et al. ......................408/156
3,518,738  7/1970  Porter...................................408/153

Primary Examiner—Gerald A. Dost
Attorney—Farley, Forster and Farley

[57] ABSTRACT

A boring bar having a nose adjustment screw modified to include different pitch threads and travel nut provided on the abutment end of the screw so that the adjustment obtained is a differential and lesser amount than either would provide separately.

7 Claims, 4 Drawing Figures

PATENTED JAN 18 1972
3,635,572
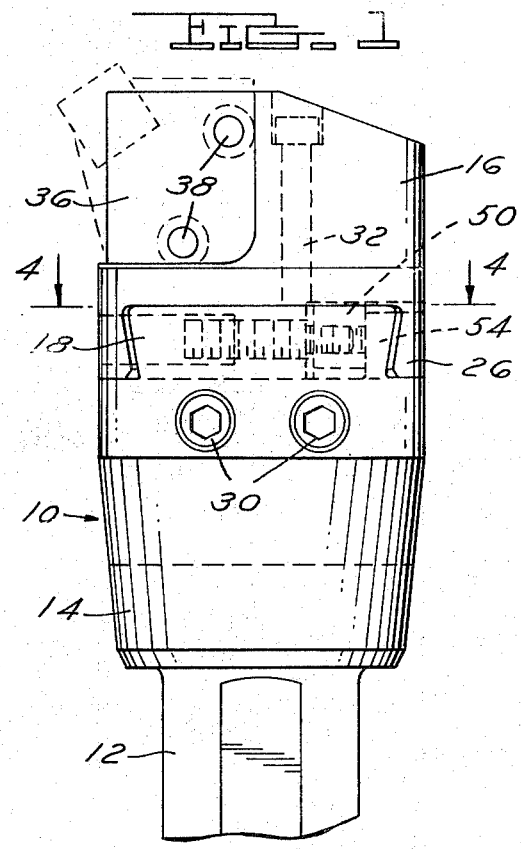
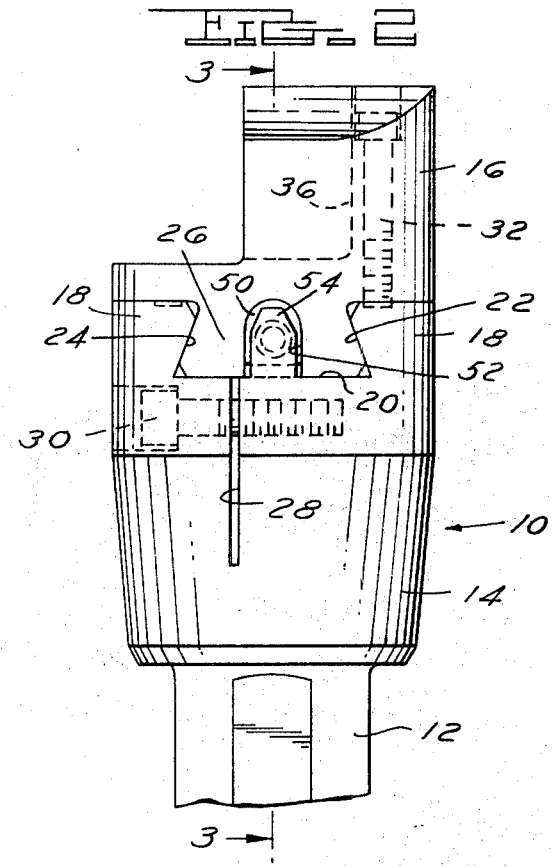
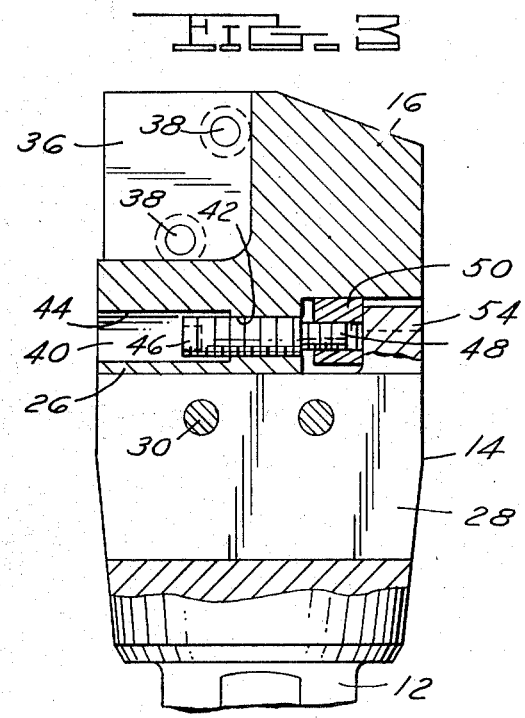
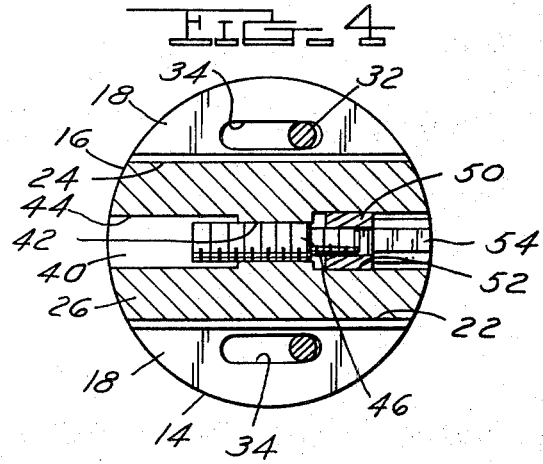
INVENTOR
JAMES J. ROBINSON
BY
*Farley, Forster & Farley*
ATTORNEYS

BORING BAR ADJUSTMENT

BACKGROUND OF THE INVENTION

Boring bars with interchangeable noses that use throwaway inserts are commonly known and used today.

Most of these bars have a guide slot in one part and a matching projection or tongue provided on the other which interfit to allow close fitted and guided lateral movement between the two. This enables the nose part, with the cutting insert, to be offset radially and for the tool to provide a reasonable range of bore sizes.

Lateral adjustment is usually obtained by an adjustment screw that is in threaded engagement with one of the two parts and bears against the other and, since the pitch of the screw threads determines the degree of control that one has over the adjustment, fine pitch threads are normally used. However, for precision work the extent of change needed may require such a slight fractional turn of the screw that is hard to obtain even with fine pitch threads.

At present, only precision adjustment noses, with vernier micrometer cutter cartridges or nibs that adjust axially, at an angle, and have the lateral adjustment means as well provide required close tolerance adjustment.

SUMMARY OF THE INVENTION

This invention relates to an improvement in boring bars with adjustable noses and, in particular, to a means and method for obtaining close adjustment control in such tools, at a relatively low cost.

In boring bars of the type shown and disclosed by U.S. Pat. No. 3,433,104 issued Mar. 18, 1969, the adjustment screw is threaded in the dovetail projection of the nose and bears against a stop provided on the bar and received in a recess provided for it in one end of the dovetail projection. The present invention adds a threaded nut on the end of the adjustment screw, between it and the stop, fits the nut to the stop pin recess so that it acts as a travel nut. Then, a smaller thread pitch is used for the travel nut than for the main body of the adjustment screw so that pitch difference between the two is the extent of movement that will be obtained.

This enables much closer adjustment control since a full revolution of the adjustment screw, while advancing one thread in the nose part, also advances one thread in the nut thereby, providing an adjustment movement limited to the pitch differential of the respective threads.

The means and method proposed are readily incorporated requiring only a new adjustment screw, with the different pitch threads on its end, and a nut shaped to fit in the stop pin recess.

DESCRIPTION OF THE DRAWINGS

FIG. 1 is a side view of a boring bar with a laterally adjustable nose, shown without the cutting insert.

FIG. 2 is another side view, turned 90°, showing the dovetail connection on the nose and bar parts.

FIG. 3 is a cross-sectional view taken in the plane of line 3—3 in the second drawing figure, and shows the adjustment features of the present invention.

FIG. 4 is a cross-sectional view taken in the plane of line 4—4 in the first drawing figure and shows a top plan view of the adjustment screw.

DETAILED DESCRIPTION OF PREFERRED EMBODIMENT

The boring bar 10 shown in the drawing includes a shank 12 with an enlarged end 14 on which is mounted the cutting tool nose 16. The bar end 14 is formed to include ways 18, in the form of dovetail slot 20, with outwardly converging side walls 22 and 24 which mate with a complementary dovetail projection or tongue 26 provided on the underside of the nose 16.

The dovetail slot connection enables the cutting tool nose 16 to be laterally adjusted on the boring bar to obtain a range of cutting diameters for the tool.

The enlarged end of the bar is slit, as at 28, lengthwise down the dovetail slot 20, and has two bolt fasteners 30 countersunk in the body and extending across the opening for threaded engagement on the opposite side to close the dovetail ways 18 and clamp cutting tool nose 16 in any selected position.

FIGS. 2 and 4 show a stop arrangement which is used to limit travel of the nose on the bar. It includes, a threaded pin 32, with a socket head, which is provided in the cutting tool nose 16 and can be turned down so that it extends into an elongated slot 34 in the top wall of one of the dovetail ways 18. Such limit stop slots 34 are provided in both ways to accommodate either right or left hand cutting tool noses.

In passing, it will be noted that the cutting tool nose 16 is shown with a chip recess 36, within which a cutting insert is to be provided, and there are also a couple of tapped holes 38, as for the insert clamp. However, no actual cutting insert is shown since its particular location, shape and geometry have no critical significance in the present invention.

Referring more closely to the dovetail connection, there is an aperture 40 extending lengthwise through a control portion of the dovetail tongue 26 and which is threaded internally, as at 42, and countersunk as at 44, to receive an adjustment screw 46 therewithin. The screw includes a smaller diameter end 48 that has screw threads of a smaller pitch than those at 42, in the nose part, and it has a travel nut 50 fitted to it.

The travel nut 50, on the end of the adjustment screw, is formed to fit a recess 52 provided between the threaded end of aperture 40 a reaction shoulder 54 extending from the boring bar end 14, and is restrained from rotation while free to move axially within the recess 52.

In the absence of the travel nut 50, the adjustment screw 46 itself could act against the shoulder 54 to push the cutting tool nose away from it, but the recess 52, in this instance, is made deeper to also accommodate the travel nut 50 on the end of the adjustment screw.

In the embodiment shown, a 24 UNIF thread is provided on the main part of the adjustment screw 46 and a 28 UNIF thread is provided on its smaller end. When the screw is turned one revolution it will move one twenty-fourth of an inch through the cutting tool nose in which it is threaded. At the same time, it will move one twenty-eighth of an inch in the travel nut 50; which actually means that the nut will be retracted on it (in an outward adjustment situation) that amount. This means that the movement obtained, due to the travel nut's engagement with the abutment shoulder, rather than the end of the adjustment screw itself, is the difference between the two or one one hundred and sixty-eighth of an inch or approximately six thousandths.

The full benefits of the present invention may be obtained by simply cutting the recess 52 deeper, rethreading the end of the adjustment screw 46, (or providing a new one) and adding the travel nut 50. For a very nominal cost, a boring bar can be converted from one that provides merely a range of bore sizes to one which also enables precision adjustments for close tolerance work.

While only a limited fine adjustment travel through the differential action is accommodated by the clearances provided, an initial greater coarse adjustment may be made in the position of the screw thread 46 within the aperture threads 42 before the nut 50 is initially engaged. It will be understood that all fine adjustments are made in a radially outward direction through impressive engagement between the nut 50 and stop 54.

I claim:

1. In a boring bar having a cutting tool nose adjustable thereon by means of an adjustment screw acting against a stop, the improvement comprising;
    differential threads provided on the adjustment screw and a rotationally restrained travel nut engaged on the end of the screw for engagement with the stop.
2. The boring bar of claim 1,
    said screw having threaded engagement within the cutting tool nose and the stop being provided on the bar.
3. The boring bar of claim 1, said bar and nose including a dovetail connection therebetween with the dovetail projection being on the cutting tool nose and having said screw extending longitudinally therethrough.

4. The boring bar of claim 3, the dovetail projection including a recess at one end for the stop, and the travel nut being fitted within such recess to preclude turning of the nut itself.

5. The boring bar of claim 4, the adjustment screw being provided within a bore hole through the dovetail projection on the cutting tool nose that is threaded to receive the screw at its inner end and is recessed within the other end thereof to allow reasonable travel for fine adjustment purposes.

6. The boring bar of claim 5, said adjustment screw being capable of coarse adjustment before differentially engaging said nut for fine adjustment.

7. The boring tool of claim 1, said cutting tool nose including a dovetail projection having said adjustment screw received in threaded engagement therewithin and extended longitudinally therethrough, said bar including dovetail ways receptive of the dovetail projection on said nose and having a limit stop provided at one end thereof for engagement by the adjustment screw, said dovetail projection including a recess for said stop in one end thereof and of a depth sufficient to also accommodate said nut, said screw having smaller pitch threads on the end having said travel nut engaged thereto, and said travel nut being formed to fit the recess in the dovetail projection provided for said stop and to preclude turning thereof in the turning of the screw to obtain fine differential adjustment.

* * * * *